Feb. 19, 1952 W. J. GRUEN 2,585,929

SYNCHRONIZING SYSTEM FOR RESONANT CIRCUIT OSCILLATORS

Filed June 10, 1949 2 SHEETS—SHEET 1

Inventor:
Wolf J. Gruen,
by Merton D. Moore
His Attorney.

Feb. 19, 1952 W. J. GRUEN 2,585,929

SYNCHRONIZING SYSTEM FOR RESONANT CIRCUIT OSCILLATORS

Filed June 10, 1949 2 SHEETS—SHEET 2

Inventor:
Wolf J. Gruen,
by Merton D. Morse
His Attorney.

Patented Feb. 19, 1952 2,585,929

UNITED STATES PATENT OFFICE 2,585,929

SYNCHRONIZING SYSTEM FOR RESONANT CIRCUIT OSCILLATORS

Wolf J. Gruen, Syracuse, N. Y., assignor to General Electric Company, a corporation of New York Application June 10, 1949, Serial No. 98,347

7 Claims. (Cl. 178—69.5)

Figure 1:
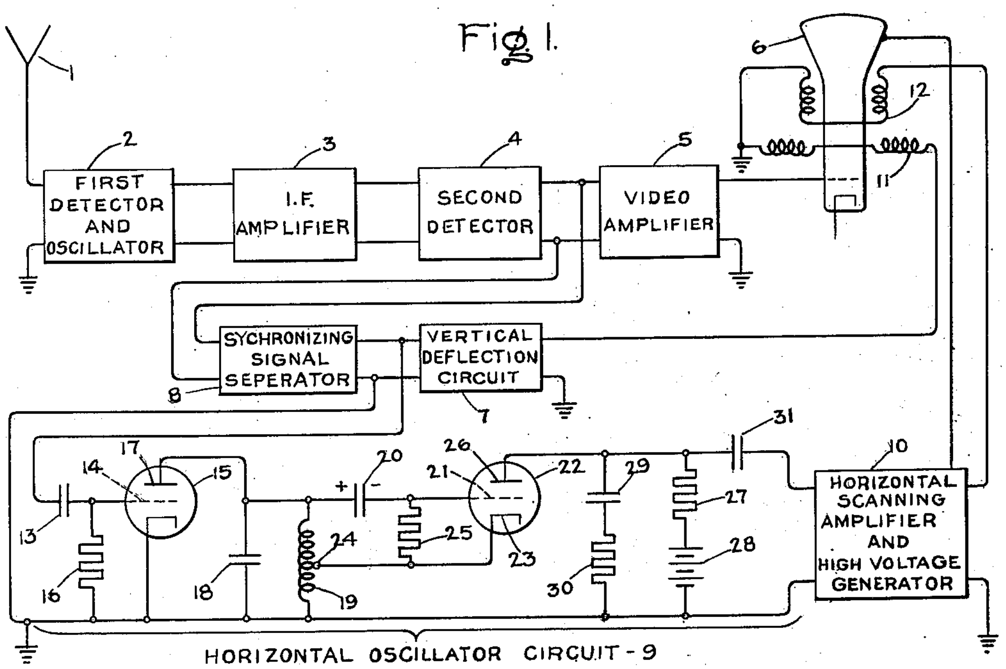

My invention relates to synchronizing systems, and, more particularly, to oscillator synchronizing systems which are adapted for use with a synchronizing signal consisting of periodically recurring pulses which may be interspersed with spurious and undesired noise pulses. While my invention is of general utility, it is particularly suitable for use in the scanning circuits, especially the line frequency scanning circuit, of a television receiver.

In television receivers, it is necessary to synchronize the scanning oscillators of the receiver with synchronizing pulses which are superimposed on the received video signal, so as to reconstruct at the receiver the transmitted image in the proper phase relationship. One way to obtain synchronization would be to apply the synchronizing pulses directly to the scanning oscillator so that each pulse initiates, or triggers, one cycle of oscillation. However, noise impulses occurring between the synchronizing pulses would cause random triggering of the oscillator and periods of asynchronous operation.

Certain arrangements heretofore proposed have provided substantial discrimination against noise by utilizing a phase detector circuit. The phase detector compares the synchronizing pulses with locally generated oscillator pulses and derives a wave which varies in accordance with the phase relation of the two sets of pulses. The derived wave is applied to an integration circuit having a long time constant so that random noise pulses present in the synchronizing signal are averaged out over a substantial number of cycles, the substantially continuous control voltage obtained from the integration circuit being used to control the frequency of the scanning oscillator. While these arrangements are satisfactory, they necessarily involve a balanced phase detector and associated amplifier in addition to the scanning oscillator itself.

A system which provides a simplicity of the direct type of synchronization while retaining the advantage of the phase detector system of substantial discrimination against noise impulses which may be present in the syncronizing signal, is described and claimed in my copending application Serial No. 95,538 filed on May 26, 1949, and assigned to the same assignee as my present invention.

In the system described in my copending application, the scanning oscillator is maintained in substantially fixed phase relation with respect to the synchronizing pulses by injecting the synchronizing pulses into the resonant tank circuit of the oscillator. The synchronizing pulses supply sufficient reactive power to the tank circuit to cause the oscillator to oscillate at the desired frequency of the synchronizing pulses. Due to the selectivity of the resonant tank circuit and the so-called fly-wheel action thereof, substantial noise rejection, as compared to direct synchronization, is achieved by such a circuit.

It is a primary object of my present invention to provide a new and improved synchronized oscillator system of the resonant tank circuit type in which substantial noise rejection is obtained.

It is another object of my invention to provide a new and improved synchronized oscillator system of the resonant tank circuit type in which substantial noise rejection is obtained with substantially the same number of circuit elements necessary for direct synchronization of the oscillator.

It is a further object of my invention to provide a new and improved synchronized oscillator adapted to be synchronized by pulses applied to the tank circuit thereof, the anode circuit of the oscillator being particularly adapted for use with a scanning wave-shaping network.

It is a still further object of my invention to provide a synchronized oscillator adapted to be synchronized by pulses applied to the tank circuit thereof, in which an output wave having a relatively steep wave front is produced.

Briefly, according to one phase of my invention, there is provided a scanning oscillator having a resonant tank circuit associated therewith. An electron discharge control device is connected across the tank circuit and synchronizing pulses are applied to the control electrode of the device. The anode of the control device is energized by the sinusoidal voltage produced across the tank circuit so that the control device is rendered conductive during positive half cycles of oscillation and absorbs energy from the tank circuit during these intervals. The synchronizing pulses render the control device non-conductive for the duration thereof and thus have the effect of adding energy to the tank circuit by rendering the energy absorbing control device non-conductive at periodic intervals. The tank circuit may be placed in the control electrode and the cathode circuit of the oscillator and the anode circuit of the oscillator may then include a scanning wave-shaping network so that the entire scanning generator and synchronizing system may comprise only a single double triode type electron discharge device. In particular embodiments, means are provided for increasing the steepness of the wave front of the scanning wave produced in the anode circuit of the oscillator so that a large accelerating anode voltage may be obtained from an inductive transient type of high voltage generator energized by the scanning oscillator output wave.

Figures 2A, 2B, 2C:
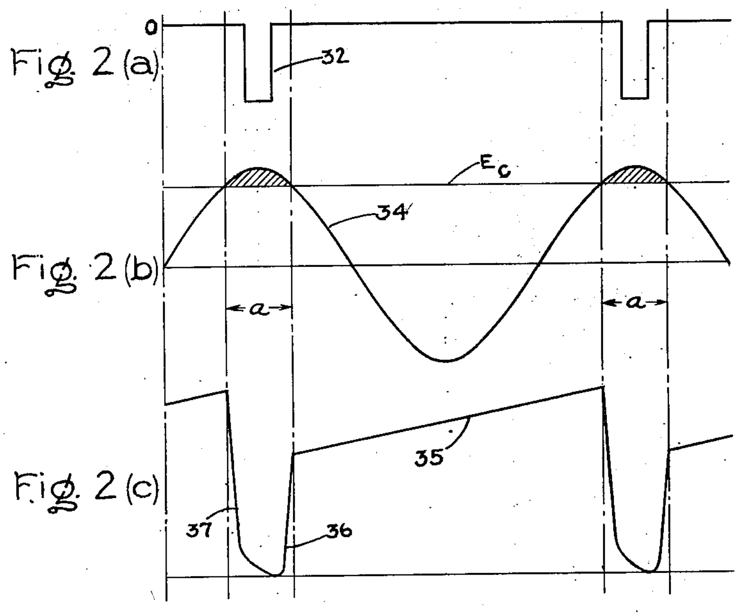
Figure 3:
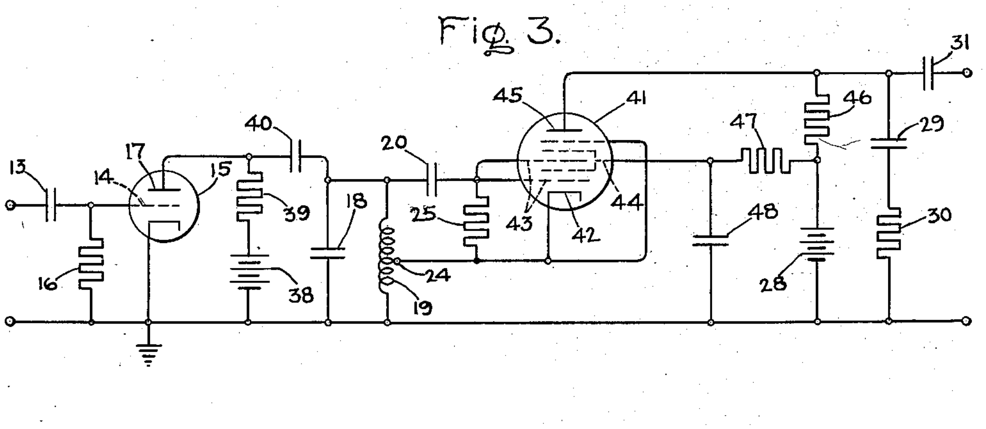
Figure 4:
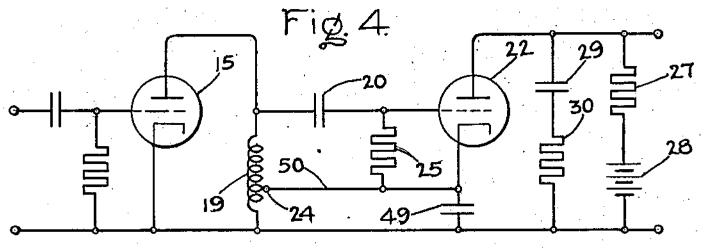
Figure 5:
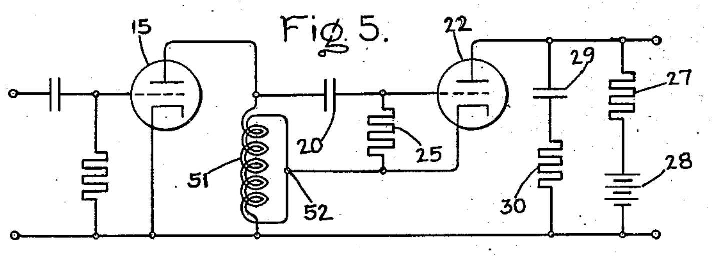

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawing wherein Fig. 1 is a schematic diagram, partly in block diagram form, of a television receiver embodying the principles of my invention; Figs. 2(a)–2(c) are timing diagrams of wave forms which are produced in the circuit of Fig. 1; and Figs. 3, 4 and 5 are circuit diagrams of alternative embodiments of the circuit of Fig. 1.

Referring now more particularly to the drawing, the system illustrated in Fig. 1 comprises a modulated carrier wave television receiver of the superheterodyne type including an antenna system 1, which is connected to a first detector and oscillator 2, to which are connected in cascade relation in the order named, an intermediate frequency amplifier 3, a second detector 4, a video frequency amplifier 5, and a cathode ray tube viewing device 6. A vertical deflection circuit 7 is connected to the output of the second detector 4 through a synchronizing signal separator 8. The output of the synchronizing signal separator is also connected to a synchronized scanning oscillator circuit 9, to be fully described hereinafter, the output of the scanning oscillator being coupled to a horizontal scanning amplifier and high voltage generator 10. The outputs of vertical deflection circuit 7 and horizontal scanning amplifier are connected to their respective scanning coils 11, 12 which surround the neck of the cathode ray tube 6, and the output of the high voltage generator is connected to the accelerating anode of the cathode ray tube 6.

The units 1 through 8 inclusive and 10 may all be of conventional well known construction so that a detailed illustration thereof is unnecessary herein. Referring briefly, however, to the operation of the above described system as a whole, television signals intercepted by antenna circuit 1 are applied to oscillator detector 2 wherein they are converted into intermediate frequency signals which are, in turn, selectively amplified in the intermediate freqency amplifier 3 and delivered to the second detector 4. The modulation components of the received signal are detected in second detector 4 and are applied to the video amplifier 5 wherein they are amplified and from which they are supplied in the usual manner to the control electrode of the cathode ray tube 6.

The detected modulation components are also supplied to the synchronizing signal separator 8, wherein the vertical and horizontal synchronizing signals are separated, the vertical synchronizing signal being applied to the vertical deflection circuit 7. Scanning waves, which are generated in the horizontal oscillator circuit 9, are amplified in the horizontal amplifier 10 and applied to the scanning coils 12 of the cathode ray tube device. Likewise, scanning waves from the vertical scanning circuit 7 are applied to the scanning coils 11 so as to produce magnetic scanning fields which deflect the electron beam of the cathode ray tube in two directions normal to each other, so as to trace a rectilinear pattern on the screen and thereby to reconstruct the transmitted image.

The scanning wave from horizontal oscillator circuit 9 is also used to drive an inductive transient type of high voltage generator 10, the output of the high voltage generator being used to energize the accelerating anode of the cathode ray tube 6. It will be understood that high voltage generator 10 may comprise any type of "inductive kick" generator, in which the rate of change of scanning current flowing through the scanning output transformer during retrace intervals is utilized to produce voltage pulses of large amplitude which are rectified and applied to the accelerating anode of the cathode ray tube.

Referring now more particularly to the portion of Fig. 1 embodying the present invention, synchronizing signals of negative polarity are connected from the synchronizing signal separator 8 through a coupling capacitor 13 to the control electrode 14 of an electron discharge device 15. The cathode of device 15 is connected to ground and the anode 17 of device 15 is connected through capacitor 18 to ground. A grid leak resistor 16 completes the control electrode path of device 15. An inductance 19 is connected across capacitor 18 and the ungrounded side of inductance 19 is connected through a capacitor 20 to the control electrode 21 of an electron discharge device 22. The cathode 23 of electron discharge device 22 is connected to a tap 24 on inductance 19. A grid leak resistor 25 completes the control electrode path of device 22. The anode 26 of device 22 is connected through a resistor 27 to the positive terminal of a unidirectional source of potential indicated by the battery 28. Anode 26 is also connected through a capacitor 29 and a resistor 30 to ground. Signals which are produced in the anode circuit of device 22 are coupled through a capacitor 31 to the horizontal scanning amplifier and high voltage generator 10.

Considering now the operation of the above-described synchronized oscillator system, it will be seen that capacitor 18 and inductance 19 form a resonant tank circuit in which sustained oscillations may be produced if sufficient energy is added by device 22 to compensate for the losses in the tank circuit. The device 22 is operated as a cathode tap Hartley oscillator in which the feedback connection to sustain oscillations is provided by connecting the cathode of device 22 to a tap 24 on the tank circuit 18, 19. The capacitor 20 and resistor 25 provide a grid bias network, the capacitor 20 being charged during the positive peaks of the sinusoidal voltage produced across tank circuit 18, 19. The charging of capacitor 20 provides a negative bias voltage which operates to hold device 22 in a state of non-conduction for the major portion of the oscillation cycle. Due to the fact that device 22 conducts for only a small portion of the oscillatory cycle, the anode current thereof will be in the form of relatively narrow pulses. The pulses of oscillator anode current operate periodically to discharge capacitor 29 which has previously been charged from the potential 28 through resistors 27 and 30. There is thus produced across capacitor 29 and resistor 30 a scanning voltage which is suitable for scanning the cathode ray tube. The scanning voltage is coupled through capacitor 31 to the horizontal scanning amplifier wherein it is suitably amplified so as to drive the horizontal scanning coils 12.

In visualizing the synchronizing action of device 15, it should be remembered that energy is oscillating back and forth in the tank circuit, being stored alternately in the capacitive branch and the inductive branch of the tank circuit. If the tank circuit has a low decrement, or high Q, the ratio of stored energy within the tank circuit to energy dissipated therein during each cycle is large. The energy stored within the tank circuit will tend to oscillate at the natural frequency thereof in spite of extraneous disturbances, and it is this inertia to change exhibited by the resonant tank circuit which is called the fly-wheel effect thereof. The oscillation of energy within the tank circuit tends to resist changes in both the amplitude and frequency of the oscillations and the tank circuit may be considered as having a time constant which is directly proportional to the Q of the tank circuit. Due to the selectivity of the resonant tank circuit, substantially all frequencies other than the resonant frequency of the tank circuit will be rejected by the tank circuit, so that only the fundamental frequency component of the synchronizing pulses, which is approximately the same as the resonant frequency of the tank circuit, will be introduced into the tank circuit to effect synchronism thereof.

Because of the selectivity of the tank circuit and the inertia to changes of amplitude and frequency of the oscillating energy, the tank circuit is analogous to a fly-wheel of substantial mass which tends to rotate at a given speed despite random braking effects thereupon. The fly-wheel effect of the tank circuit will have an averaging effect on random noise pulses interspersed with the periodic synchronizing pulses which is comparable to the averaging effect of the integration circuit used with the phase detector type of synchronizing system. Hence, the synchronizing signal may be applied directly to the tank circuit of the scanning oscillator and still obtain a substantial discrimination against spurious and undesired noise pulses present in the synchronizing signal.

Considering now the manner in which control tube 15 injects the synchronizing pulses into the tank circuit 18, 19, it will be apparent that device 15 will conduct during the positive half-cycles of the sinusoidal voltage produced across tank circuit 18, 19, and, during these positive half-cycles of the sinusoidal oscillator voltage, device 15 will have a shunting effect across tank circuit 18, 19, which will be dependent upon the anode-cathode space path resistance of device 15. Considering the control tube 15 as merely a resistance shunted across the tank circuit during a predetermined portion of each cycle of oscillation, it will be apparent that the device 15 acts as a brake upon the fly-wheel action of the tank circuit and absorbs a portion of the energy stored therein during the periods when device 15 is conducting. The synchronizing pulses, however, which are applied to the control electrode of device 15 with a negative polarity, render the energy absorbing device 15 non-conductive at periodic intervals.

If the free running frequency of the oscillator is not the same as the frequency of the synchronizing pulses, the synchronizing pulses must supply the required amount of reactive energy so as to cause the tank circuit to oscillate at the new frequency of the synchronizing pulses. However, due to the above-described fly-wheel effect and the filtering action of the resonant tank circuit, only the fundamental frequency energy content of the synchronizing pulses is effective to lock the oscillator in step therewith. The frequency range over which the synchronizing pulses will lock the oscillator in phase therewith will be directly proportional to the amplitude of the fundamental frequency component of the synchronizing pulses injected into the tank circuit, and inversely proportional to the Q of the resonant tank circuit.

It is an important feature of my present invention to provide a synchronized oscillator system in which the control device 15 is energized directly from the sinusoidal voltage produced across the tank circuit. Although the selectivity and fly-wheel effect of the resonant tank circuit are utilized in the present invention in a manner similar to that disclosed in my copending application referred to heretofore, it will be apparent that the manner in which the synchronizing pulses are introduced into the tank circuit is substantially different. In the present invention, the synchronizing pulses have the effect of removing the braking action of the electron discharge control device and thereby to add energy to the tank circuit by removing the energy absorbing effect thereof, whereas in my above-mentioned copending application positive synchronizing pulses are applied to the control device to add energy directly to the tank circuit during the occurrence of the synchronizing pulses.

In the present invention wherein the resonant tank circuit may be situated in the cathode circuit of the oscillator, the anode circuit of the oscillator may be employed to produce a saw tooth waveform through the action of wave-shaping network 27, 29 and 30. Also, with one side of the tank circuit connected to ground, the sinusoidal voltage across the tank circuit can be used as a source of anode voltage for control device 15. With the anode of device 15 energized by the sinusoidal tank voltage, the effect of extraneous noise impulses which occur during the skirt portions of the positive half-cycles of the oscillator voltage is substantially reduced due to the relatively low anode voltage and correspondingly small control electrode cut-off potential of device 15 during these periods, which causes the noise impulses to be clipped at relatively low energy levels. Also, during the negative half-cycles of the sinusoidal tank voltage, the control device 15 is almost completely insensitive to extraneous noise impulses and alternate synchronizing pulses of double repetition rate which occur at the end of each frame period and which are present during the non-conducting period of control device 15.

In order to illustrate further the operation of oscillator 22 and the effect of control device 15 thereon, reference is now made to Figs. 2(*a*)–2(*c*) wherein there is illustrated the waveforms associated with various portions of the circuit. In Fig. 2(*a*) there is illustrated the negative going synchronizing pulses 32, which are applied to the control electrode of device 15. The pulses 32 are negative with respect to ground potential due to the clamping action of the control electrode and cathode of device 15 which act as a diode to prevent a positive voltage from appearing across resistor 16. Due to the selectivity of the tank circuit 18, 19, only the fundamental frequency component of the synchronizing pulses 32 will appear across the tank circuit, as has been described heretofore.

In Fig. 2(*b*) there is illustrated the sinusoidal voltage 34 which is produced across the tank circuit 18, 19 due to the oscillation of energy therein. Due to the biasing effect of the grid time constant 20, 25, the anode current of device 22 flows only during the positive peaks of the sinusoidal voltage 34, the control electrode cutoff potential of device 22 being indicated by the reference characteristic $E_c$. The angle of conduction of device 22 is indicated by the reference *a* and it is apparent from the drawing that the angle of conduction of device 22 is a small portion of the total oscillation cycle. The flow of anode current during the shaded portions of the sinusoidal voltage 34 discharges the capacitor 29 and produces a pulse voltage across resistor 30.

The wave form produced in the anode circuit of device 22 due to the wave-shaping network 27, 29 and 30, is illustrated in Fig. 2(*c*), wherein there is shown the scanning wave having a saw tooth wave portion 35, due to the charging action of capacitor 29, and a pulse wave portion 36 which is produced by the voltage drop across resistor 30. It will be apparent that the pulse portion 36 of the scanning wave form of Fig. 2(*c*) is obtained from the positive peaks of the sinusoidal voltage produced across the tank circuit and, therefore, the leading edge 37 of the pulse wave form will have a steepness which is dependent upon the portion of the sinusoidal voltage during which conduction occurs and the amplitude of the sinusoidal tank voltage.

In order that the steepness of the wave front 37 of the scanning wave form of Fig. 2(*c*) may be substantially increased, so that the scanning wave form produced in the anode circuit of the oscillator may be utilized to drive an "inductive kick" type of high voltage generator, there is provided in the alternative embodiments illustrated in Figs. 3, 4 and 5, alternative circuit arrangements whereby the amplitude of sinusoidal voltage may be increased, a narrower conduction angle may be obtained, and a scanning voltage of steeper wave front may be provided.

Referring now to Fig. 3, there is illustrated a modified form of the synchronized oscillator system shown and described in connection with Fig. 1. In Fig. 3 corresponding elements have been indicated by the same reference numerals and a detailed description thereof is considered unnecessary herein. In Fig. 3 the control device 15 is energized from a unidirectional source of potential, indicated by the battery 38, through a resistor 39. The anode 17 of device 15 is coupled through a capacitor 40 to the tank circuit 18, 19 of the scanning oscillator. With the anode of device 15 energized from a unidirectional source of potential, increased amplification of the synchronizing pulses applied to the control electrode of device 15 is obtained and, hence, increased synchronizing energy is injected into the tank circuit. It should be noted that the unidirectional potential existing at anode 17 during steady state conditions should be less than one-half of the peak to peak amplitude of the sinusoidal voltage which appears across the tank circuit 18, 19. This is because the sinusoidal tank voltage should be coupled through capacitor 40 to the anode 17 of device 15 with sufficient amplitude to render device 15 non-conductive during the negative half cycles of the tank circuit voltage, in the manner similar to that obtained in the circuit of Fig. 1.

In Fig. 3, a pentagrid type electron discharge device has been substituted for the triode scanning oscillator of Fig. 1, the pentagrid type device being indicated by the reference character 41. The cathode 42, the first and third electrodes 43, and the second and fourth electrodes 44 of device 41, form a triode oscillator which operates in a manner similar to the triode oscillator of Fig. 1. Due to the fact that the electrodes 44 act as the anode of the oscillator, the mutual conductance of the oscillator section of device 41 is relatively independent of the voltage of anode 45 of device 41. Therefore, the wave shaping network 29, 30, 46, may be utilized in the anode circuit without the interaction with the oscillator section of device 41. The electrodes 44 which form the anode of the oscillator section of device 41 are energized from the battery 28 through a resistor 47, and are by-passed to ground by means of a capacitor 48. With the oscillator section relatively independent of the anode voltage of device 41, the instantaneous potential of anode 45 may be reduced to a relatively low value when the sweep capacitor 29 is discharged, so that a substantial voltage swing is available across capacitor 29 and resistor 30 thereby to produce the desired scanning waveform. Also, due to the fact that the mutual conductance of the oscillator section of device 41 may be substantially greater than the mutual conductance of conventional triodes, the conduction angle of the device 41 is relatively narrow and depends upon the excitation of the oscillator and the size of the grid leak resistor 25. While the pentagrid type scanning oscillator has been indicated as being synchronized from a triode type control device 15, it will be evident that the scanning oscillator 41 may be synchronized by any other suitable means whereby the synchronizing pulses are injected into the tank circuit of the oscillator.

In Fig. 4 there is illustrated the circuit diagram of an alternative embodiment of my invention wherein additional means are provided for increasing the steepness of the leading edge of the scanning wave form produced in the anode circuit of the scanning oscillator. In Fig. 4 elements which correspond to those of Fig. 1 have been indicated by the same reference numerals and a detailed description thereof is considered unnecessary herein. The tank circuit to which synchronizing pulses are applied by the operation of device 15 is illustrated in Fig. 4 as comprising the portion of inductance 19 below the tap 24 thereof, and the capacitor 49. The capacitor 49 and the lower portion of inductance 19 form the resonant tank circuit, feedback necessary to sustain oscillations therein being obtained by connection of the upper end of inductance 19 to the control electrode of device 22 through the grid biasing network 20, 25. The coupling between the upper and lower portions of the coil 19 will determine, to a substantial degree, the excitation voltage which is applied to the oscillator tube and correspondingly the conduction angle thereof. If the upper and lower portions of inductance 19 are not closely coupled, the leakage reactance therebetween will appear as an inductance in series with the tap 24, or in other words, an inductance in the cathode lead 50. The leakage reactance will tend to prevent high excitation of the oscillator. However, the capacitor 49 by-passes any leakage reactance which may be present in the cathode circuit of the oscillator and thus provides increased excitation for and consequently a narrower conduction angle of device 22. The steepness of the leading edge of the scanning wave form produced in the anode circuit is substantially increased thereby.

An additional modification of my invention is shown in Fig. 5 wherein increased excitation of the scanning oscillator is obtained in a very simple and economical manner. In the circuit of Fig. 5, circuit elements identical to those of Fig. 1 are indicated by the same reference numerals and no discussion need be made thereof in connection with Fig. 5. The tank circuit of the oscillator of Fig. 5 comprises a simple, bi-filar wound inductance 51, the center point 52 of which is connected to the cathode of the oscillator tube 22. By using the bi-filar wound inductance 51 sufficient distributed capacity is obtained between the turns of the inductance to tune the inductance to the relatively low frequency of 15,750 cycles required by the horizontal synchronizing pulses, without the use of the conventional tank circuit capacitor 18 shown in Fig. 1. The single inductance 51 comprises the entire tank circuit of the oscillator and synchronizing pulses obtained from the anode of device 15 may be injected into the tank circuit in a manner similar to that described in connection with Fig. 1. The bi-filar wound inductance 51 provides substantially increased coupling between the upper and lower portions of the inductance and thus gives a relatively high excitation for the oscillator tube 22. Also, the distributed capacity between the center point 52 of inductance 51 and ground operates to by-pass any leakage reactance which may exist between the portions of inductance 51, in a manner similar to the tank circuit capacitor 49 described in connection with Fig. 4. A narrower conduction angle is thereby obtained and the scanning wave form produced in the anode circuit of the oscillator is provided with a substantially steeper leading edge. The scanning wave form is thus suitable for driving an "inductive kick" type of high voltage generator, and for providing increased high voltage therefrom.

While my invention has been described by reference to particular embodiments thereof, it will be understood that numerous modifications may be made by those skilled in the art without departure from my invention. I, therefore, aim in the appended claims to cover all such equivalent variations as come within the true spirit and scope of my invention.

What I claim as new and desire to secure by Letters Patent of the United States is:

1. In a television receiver, the combination of, a source of synchronizing pulses, a resonant circuit for storage of oscillatory energy therein, means for producing oscillations in said resonant circuit of substantially the same frequency as said synchronizing pulses, and means for maintaining said produced oscillations in substantially fixed phase relation with respect to said synchronizing pulses comprising, means including an electron discharge device normally conductive during a portion of each oscillator cycle connected in circuit with said resonant circuit for absorbing a portion of said energy from said resonant circuit, and means for rendering said energy absorbing means ineffective during the occurrence of said synchronizing pulses.

2. In an oscillator synchronizing system, the combination of a source of synchronizing pulses, a resonant circuit for storing oscillatory energy therein, means for producing oscillations in said resonant circuit of substantially the same frequency as said synchronizing pulses, an electron discharge device connected across said resonant circuit, means for rendering said device conductive during a predetermined portion of the oscillator cycle for absorbing a portion of said energy, and means for rendering said device non-conductive in accordance with said synchronizing pulses whereby frequency corrective energy proportional to the fundamental freqency energy content of said synchronizing pulses is supplied to said resonant circuit so as to maintain said produced oscillations in substantially fixed phase relation with respect to said synchronizing pulses.

3. In a television receiver, the combination of, a source of synchronizing pulses, a resonant circuit, for storage of oscillatory energy therein, a first electron discharge device having at least a cathode, a control electrode and an anode, means including said cathode and said control electrode for producing oscillations in said resonant circuit of a frequency substantially equal to the frequency of said synchronizing pulses, means for maintaining said produced oscillations in substantially fixed phase relation with respect to said synchronizing pulses comprising, a second electron discharge device having at least an input electrode and an output electrode, said output electrode being connected to said resonant circuit, thereby to render said second device conductive over a substantial portion of the oscillation cycle thereof, for absorbing a portion of said energy and means for connecting said source of synchronizing pulses to said input electrode, whereby said second device is rendered non-conductive in accordance with said synchronizing pulses.

4. In a television receiver, the combination of a source of synchronizing pulses, a resonant tank circuit comprising a bi-filar wound inductance tuned to the frequency of said synchronizing pulses by the distributed capacity thereof, an electron discharge device having at least a cathode, a control electrode, and an anode, means including said cathode and said control electrode for producing oscillations in said tank circuit, means for injecting said synchronizing pulses into said tank circuit, said means comprising a second electron discharge device having a grid circuit energized from said source and an anode circuit energized from the oscillations produced across said tank circuit, thereby to maintain said produced oscillations in substantially fixed phase relation with respect to said synchronizing pulses, and means for deriving from said anode a scanning wave suitable for effecting a scanning operation in the receiver.

5. In a television receiver, the combination of a source of synchronizing pulses, first and second inductances connected in series and closely coupled together, a capacitor connected around said first inductance, said capacitor and said first inductance comprising a tank circuit tuned to the frequency of said synchronizing pulses, an electron discharge device having at least a cathode, a control electrode and an anode, means for connecting said cathode to said tank circuit, means for connecting said control electrode to said second inductance thereby to produce sustained oscillations in said tank circuit, means for injecting said synchronizing pulses into said tank circuit, said means comprising a second electron discharge device having a grid circuit energized from said source and an anode circuit energized from the oscillations produced across said tank circuit, thereby to maintain said produced oscillations in substantially fixed phase relation with respect to said synchronizing pulses, and means for deriving from said anode a scanning wave suitable for effecting a scanning operation in the receiver.

6. In a television receiver, the combination of, a source of synchronizing pulses, a resonant circuit, a first electron discharge device having at least a cathode, a control electrode and an anode, means including said cathode, said control electrode and said anode for producing oscillations in said resonant circuit of a frequency substantially equal to the frequency of said synchronizing pulses, means for maintaining said produced oscillations in substantially fixed phase relation with respect to said synchronizing pulses comprising, a second electron discharge device having at least a cathode, an input electrode and an output electrode, said output electrode and cathode of said second device being connected across said resonant circuit so as to render said second device conductive in response to said oscillations over a substantial portion of the oscillation cycle thereof, means for connecting said source of synchronizing pulses between said input electrode and cathode of said second device in such polarity that said second device is rendered non-conductive in accordance with said synchronizing pulses, and means for deriving from the anode of said first device a scanning wave suitable for effecting a scanning operation in the receiver.

7. In a television receiver, the combination of, a source of synchronizing pulses, a resonant circuit, a first electron discharge device having at least a cathode, a control electrode, a screen electrode and an anode, means including said cathode, said control electrode and said screen electrode for producing oscillations in said resonant circuit of a frequency substantially equal to the frequency of said synchronizing pulses, means for maintaining said produced oscillation in substantially fixed phase relation with respect to said synchronizing pulses comprising, a second electron discharge device having at least a cathode, an input electrode and an output electrode, said output electrode and cathode of said second device being effectively connected across said resonant circuit so as to render said second device conductive in response to said oscillations over a substantial portion of the oscillation cycle thereof, means for connecting said source of synchronizing pulses between said input electrode and cathode of said second device in such polarity that said second device is rendered non-conductive in accordance with said synchronizing pulses, and means for deriving from the anode of said first device a scanning wave suitable for effecting a scanning operation in the receiver.

WOLF J. GRUEN.

REFERENCES CITED

The following references are of record in the file of this patent:

UNITED STATES PATENTS

| Number | Name | Date |
|---|---|---|
| 2,197,900 | Schlesinger | Apr. 23, 1940 |
| 2,227,066 | Cork et al. | Dec. 31, 1940 |
| 2,240,136 | Geiger | Apr. 29, 1941 |
| 2,273,193 | Heising | Feb. 17, 1942 |
| 2,434,400 | Easton | Jan. 13, 1948 |
| 2,440,073 | Bradley | Apr. 20, 1948 |
| 2,470,027 | Goldberg | May 10, 1949 |
| 2,470,573 | Moore | May 17, 1949 |

FOREIGN PATENTS

| Number | Country | Date |
|---|---|---|
| 114,056 | Australia | Oct. 30, 1941 |
| 847,675 | France | Oct. 13, 1939 |